(12) United States Patent
Cao et al.

(10) Patent No.: US 10,845,511 B2
(45) Date of Patent: Nov. 24, 2020

(54) SMART MIRROR

(71) Applicant: HEWLETT-PACKARD DEVELOPMENT COMPANY, L.P., Houston, TX (US)

(72) Inventors: Zheng Cao, Houston, TX (US); Dimitre Mehandjiysky, Houston, TX (US); Kevin Luke Massaro, Houston, TX (US); Michael Christopher Bartha, Vancouver, WA (US); Brandon James Lee-Haist, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 170 days.

(21) Appl. No.: 16/098,119

(22) PCT Filed: Jun. 30, 2016

(86) PCT No.: PCT/US2016/040478
§ 371 (c)(1),
(2) Date: Oct. 31, 2018

(87) PCT Pub. No.: WO2018/004615
PCT Pub. Date: Jan. 4, 2018

(65) Prior Publication Data
US 2019/0146128 A1    May 16, 2019

(51) Int. Cl.
*G02B 5/08* (2006.01)
*G06F 3/00* (2006.01)
(Continued)

(52) U.S. Cl.
CPC .............. *G02B 5/08* (2013.01); *G06F 3/005* (2013.01); *G06F 3/011* (2013.01); *G06F 3/0304* (2013.01); *G02B 27/144* (2013.01)

(58) Field of Classification Search
CPC ......... G20B 5/08; G02B 27/144; G06F 3/005; G02F 3/011
(Continued)

(56) References Cited

U.S. PATENT DOCUMENTS 6,560,027 B2    5/2003  Meine
9,274,553 B2    3/2016  Erhart et al.
(Continued)

FOREIGN PATENT DOCUMENTS

CN    104199542    12/2014
CN    104223858    12/2014
(Continued)

OTHER PUBLICATIONS

Mirror (2011), 2011, < http://nytlabs.com/projects/mirror.html >.

*Primary Examiner* — Ricky D Shafer
(74) *Attorney, Agent, or Firm* — Dierker & Kavanaugh PC

(57) ABSTRACT

In one example, a smart mirror. The smart mirror includes a display adjacent one side of a half-mirror, sensors to acquire biometric information of a user facing an opposite side of the half-mirror, and a controller coupled to the sensors and the display. The controller determines from the biometric information a focal distance of the user. If the focal distance corresponds to the display, the controller presents a user interface on the smart mirror in a highly-visible manner and a reflection of the user in a less-visible manner. If the focal distance corresponds to the reflection of the user, the controller presents the user interface on the smart mirror in a less-visible manner and the reflection of the user in a highly-visible manner.

15 Claims, 10 Drawing Sheets

(51) Int. Cl.
  *G06F 3/01* (2006.01)
  *G06F 3/03* (2006.01)
  *G02B 27/14* (2006.01)

(58) Field of Classification Search
  USPC .......................................................... 359/839
  See application file for complete search history.

(56) References Cited

U.S. PATENT DOCUMENTS

| | | | |
|---|---|---|---|
| 10,318,793 B2* | 6/2019 | Beaudet | G06K 9/00228 |
| 2004/0258274 A1* | 12/2004 | Brundage | G07D 7/128 |
| | | | 382/100 |
| 2007/0124694 A1 | 5/2007 | Van De Sluis et al. | |
| 2008/0107309 A1* | 5/2008 | Cerni | G06K 9/00033 |
| | | | 382/115 |
| 2013/0051631 A1* | 2/2013 | Hanna | G06K 9/00617 |
| | | | 382/117 |
| 2014/0168210 A1 | 6/2014 | Bromer | |
| 2016/0019868 A1 | 1/2016 | Park et al. | |
| 2016/0048990 A1 | 2/2016 | Seo et al. | |
| 2016/0080662 A1 | 3/2016 | Saban et al. | |
| 2018/0285669 A1* | 10/2018 | Mapen | G06K 9/00604 |

FOREIGN PATENT DOCUMENTS

| | | |
|---|---|---|
| CN | 204764620 | 11/2015 |
| CN | 204931075 U | 1/2016 |
| EP | 2975449 | 1/2016 |
| JP | 2010266918 | 11/2010 |
| KR | 20120074499 | 7/2012 |
| WO | WO-2013118205 | 8/2013 |
| WO | WO-2013180651 A1 | 12/2013 |

* cited by examiner

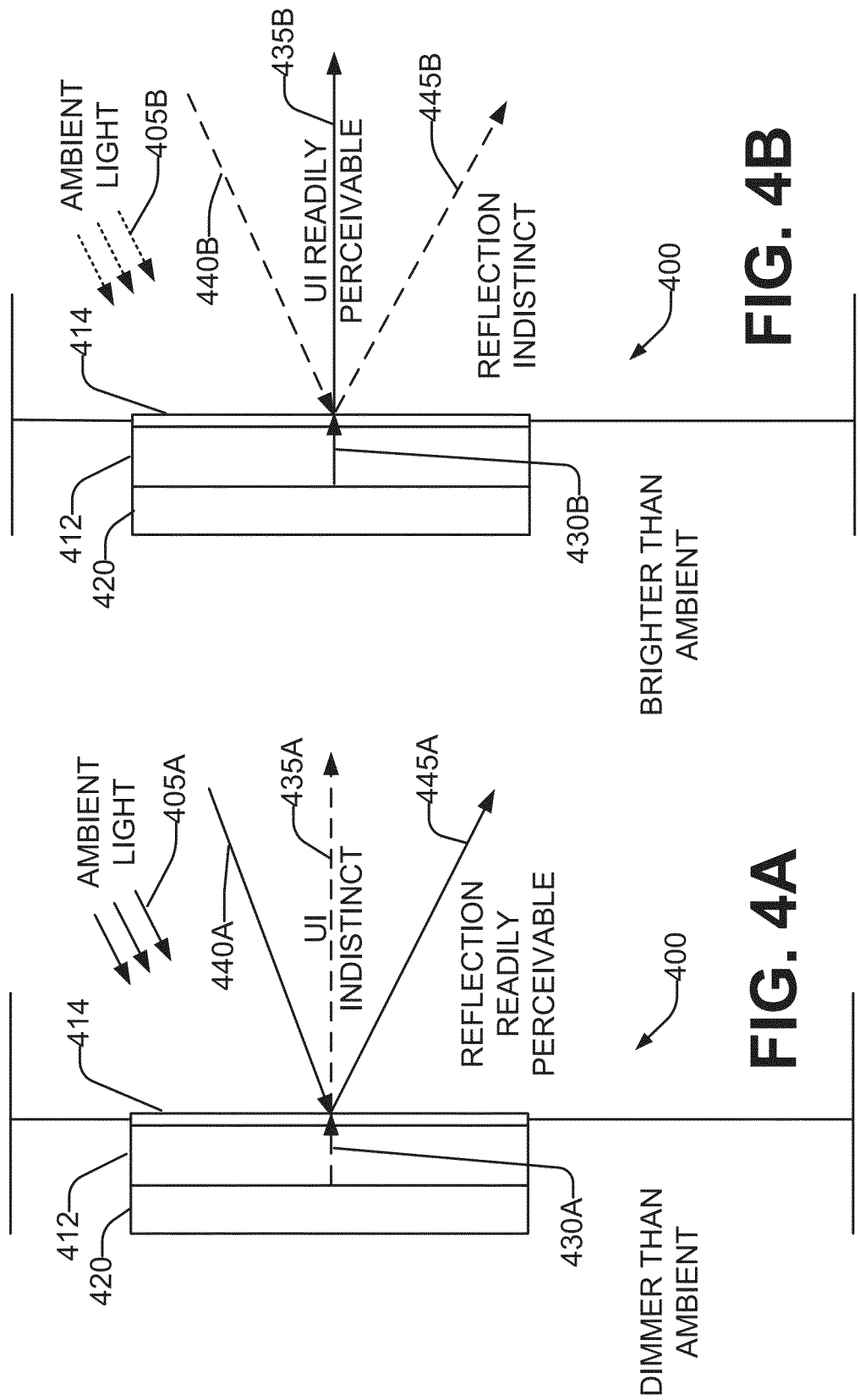

SMART MIRROR

BACKGROUND

A "smart mirror" is a device that integrates a computer, a display, and a half-mirror surface. The half-mirror surface allows a user of the smart mirror to see his or her reflection, while the integrated display is an output device which enables the smart mirror to present a user interface (UI) to the user of the smart mirror. As a user input mechanism to enable the user to interact with the UI, in many cases the smart mirror uses a touchscreen. When the user touches near or on the mirror surface, the position and/or other characteristics of the users touch can be detected by the smart mirror and used to control its operation.

BRIEF DESCRIPTION OF THE DRAWINGS

FIGS. 4A-4B are schematic representations of the operation of a smart mirror in a mirror mode and in a user interface mode respectively, in accordance with an example of the present disclosure.

DETAILED DESCRIPTION

Figure 1:
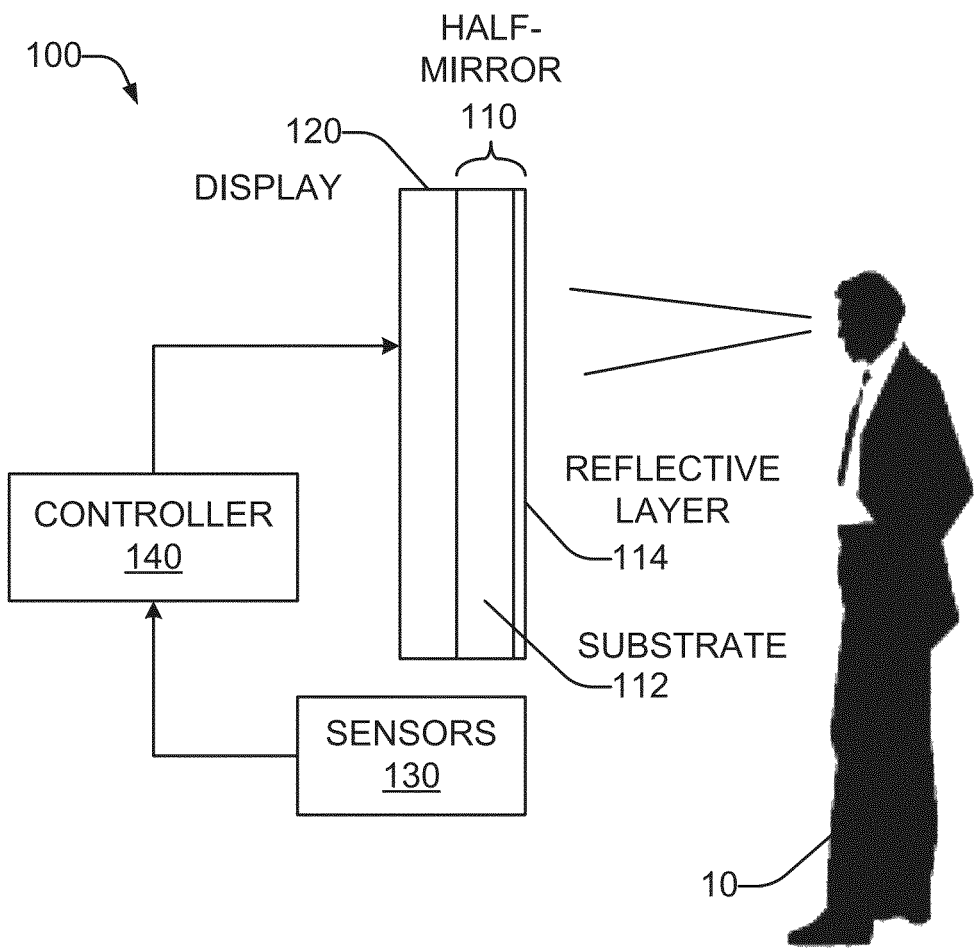
FIG. 1 is a schematic representation of a smart mirror in accordance with an example of the present disclosure.

Using a touchscreen as the user input mechanism for a smart mirror can impose some undesirable constraints on the user. Users may have their hands occupied or dirty when they want to use the touchscreen. For example, the user may have a smart mirror installed in a bathroom, and may wish to interact with it while getting dressed for work in the morning in order to check their email, find out what the weather will be that day, or get the last evening's sports scores. However, touchscreen access can be inconvenient or impossible if the user is washing, shaving, dressing, brushing their teeth, holding items, etc. at the same time as they wish to interact with the computer. Soap, shaving cream, hand lotion, etc. on the user's hands can smudge the mirror surface when using a touchscreen. In addition, a user interface (UI) which is displayed on the mirror at a fixed position and/or in a fixed size can be inconvenient or difficult for the user to interact with. For example, the UI may be positioned too low on the mirror for convenient operation by a tall user, or too high on the mirror for a shorter user. A UI that is conveniently-sized when the user is standing close to the mirror may be too small in appearance when the user is standing back further. Also, how far back from the mirror a user can stand and still be able to operate the touchscreen is restricted by the length of the user's reach.

Referring now to the drawings, there is illustrated an example of a smart mirror having a user interface which uses eye focal distance as an input mechanism for the user to control operation of the smart mirror. The smart mirror detects or determines the focal distance of the user when facing the smart mirror. The user's eye focal distance determines whether the user's reflection, or the smart mirror's UI, is more prominently visible to the user, which is automatically done by the smart mirror. Also, when the user's eye focal distance is such that the smart mirror's UI is more prominently visible, the user can interact with the UI by gazing at specific content items presented by the UI. Gazing at a particular content item can cause an action associated with that item to be performed in response by the smart mirror.

Eye focal distance is one type of biometric information that can be acquired and used by the smart mirror. The smart mirror can also acquire and use other types of biometric information in the user's interaction with the smart mirror. For example, the position of the user with respect to the plane of the smart mirror, and/or the distance of the user from the smart mirror, can be used to automatically determine the location on the smart mirror at which the UI is presented, and the size of the UI on the smart mirror. Using these types of biometric information for user interaction with the smart mirror can significantly improve the usefulness and usability of the mirror. When the user focuses on his or her reflection in the mirror, the reflection is visible everywhere in the mirror with minimal or no obscuring by the UI. When the user focuses on the UI, the UI is visible with minimal or no distraction by the user's reflection. Hands-free operation of the smart mirror via the UI allows the user to perform other tasks with his or her hands while interacting with the smart mirror at the same time. And the size and location of the UI on the smart mirror are optimized for the particular user, making interaction with the UI more convenient and ergonomic.

As defined herein and in the appended claims, "focal distance" may be broadly understood to mean a point in space in front of a user at which the vision gaze of the user's left and right eyes converge. Also as defined herein and in the appended claims, "biometric information" may be broadly understood to mean information related to human body characteristics of a user which can identify or describe individuals. This may include physiological characteristics: those related to shape of the body; for example, facial features, body geometry (e.g. the relationship of body parts to each other, such as head and shoulders), and the retina and iris of the eye. Another type of biometric information is behavioral: related to the behavior of a person. This can include the position where the eyes of the person are looking and focused, and how the person is positioned, including positioning with respect to another object.

Considering now a smart mirror, and with reference to FIG. 1, one example smart mirror 100 includes a half mirror (or a one-way mirror) 110, a display 120, plural sensors 130, and a controller 140.

The half-mirror 110 includes a substrate 112 and a reflective layer 114. While the reflective layer 114 is illustrated at a front edge of the half-mirror 110, in other examples it may be within or behind the substrate 112. The substrate 112 may be glass or another substance. The reflective layer 114 is thin, often metallic, and partially transparent. In some examples, the reflective layer 114 may be sparsely applied to the substrate 112, with about half of the reflective material that would be needed to make a mirror opaque. When light strikes the reflective layer, about half of the light will be transmitted, and the remainder reflected. As a result, the half-mirror 110 is partially reflective and partially transparent. When the side of the half-mirror 110 which the user 10 is facing is significantly brighter than the opposite side of the half-mirror 110, the user 10 sees mostly his reflection. Conversely, when the side of the half-mirror 110 which the user 10 is facing is significantly dimmer than the opposite side of the half-mirror 110, the user 10 mostly sees through the half-mirror 110 to the other side instead of his reflection. In one example, the substrate 112 includes a polymer dispersed liquid crystal (PDLC) film which is operable to control transparency of the substrate 112.

The display 120 is disposed adjacent one side of the half-mirror 110. The display 120 displays the user interface of the smart mirror 100 to the user 10. In various examples, the display is used to present the user interface as a graphical user interface (GUI), although in other examples the UI can be text-based or of another type. The brightness of the display 120 is controllable to make it brighter or dimmer than the ambient lighting that impinges the half-mirror 110 on the side of the half-mirror 110 which the user 10 is facing. By controlling the brightness of the display 120 appropriately in view of the ambient lighting, the smart mirror 100 can determine whether the user 10 more prominently sees the user interface through the half-mirror 110, or the user's reflection from the reflective layer 114 of the half-mirror 110. In one example, the display 120 is an OLED (organic light-emitting diode) display. An OLED display can be advantageous for the smart mirror 100 because it can be thin, lightweight, inexpensive, and/or shatter-resistant. Because an OLED display does not use a backlight, it can allow the smart mirror 100 to operate in a mostly-reflective manner in dimly-lit environments.

The sensors 130 acquire biometric information of the user 10 who is facing the opposite side of the half-mirror 110 from the display 120. The sensors 130 may also acquire information about the user's environment. The smart mirror 100 may include different types of sensors, and/or multiple sensor of the same type.

The controller 140 is communicatively coupled to the sensors 130 and the display 120. The controller 140 may also be communicatively coupled to a communications network (not shown) external to the smart mirror 110, such as for example the Internet. The controller 140 is configured to determine from the biometric information a focal distance of the user 10. The controller 140 is further configured to present, using the display 120, a user interface on the smart mirror 100 in a highly-visible manner and a reflection of the user 10 in a less-visible manner if the focal distance of the user corresponds to the display 120. The controller 140 is further configured to present the user interface on the smart mirror 100 in a less-visible manner and the reflection of the user 10 in a highly-visible manner if the focal distance corresponds to the reflection of the user 10. The focal distance is considered to "correspond to" the user interface if the focal distance is within a predefined tolerance of the distance of the user to the half-mirror of the smart mirror. The focal distance is considered to "correspond to" the reflection of the user if the focal distance is within a predefined tolerance of twice the distance of the user to the half-mirror of the smart mirror.

In some examples, the user can additionally or alternatively interact with the smart mirror 100 via touch, voice, gesture, or in another manner.

Figure 2:
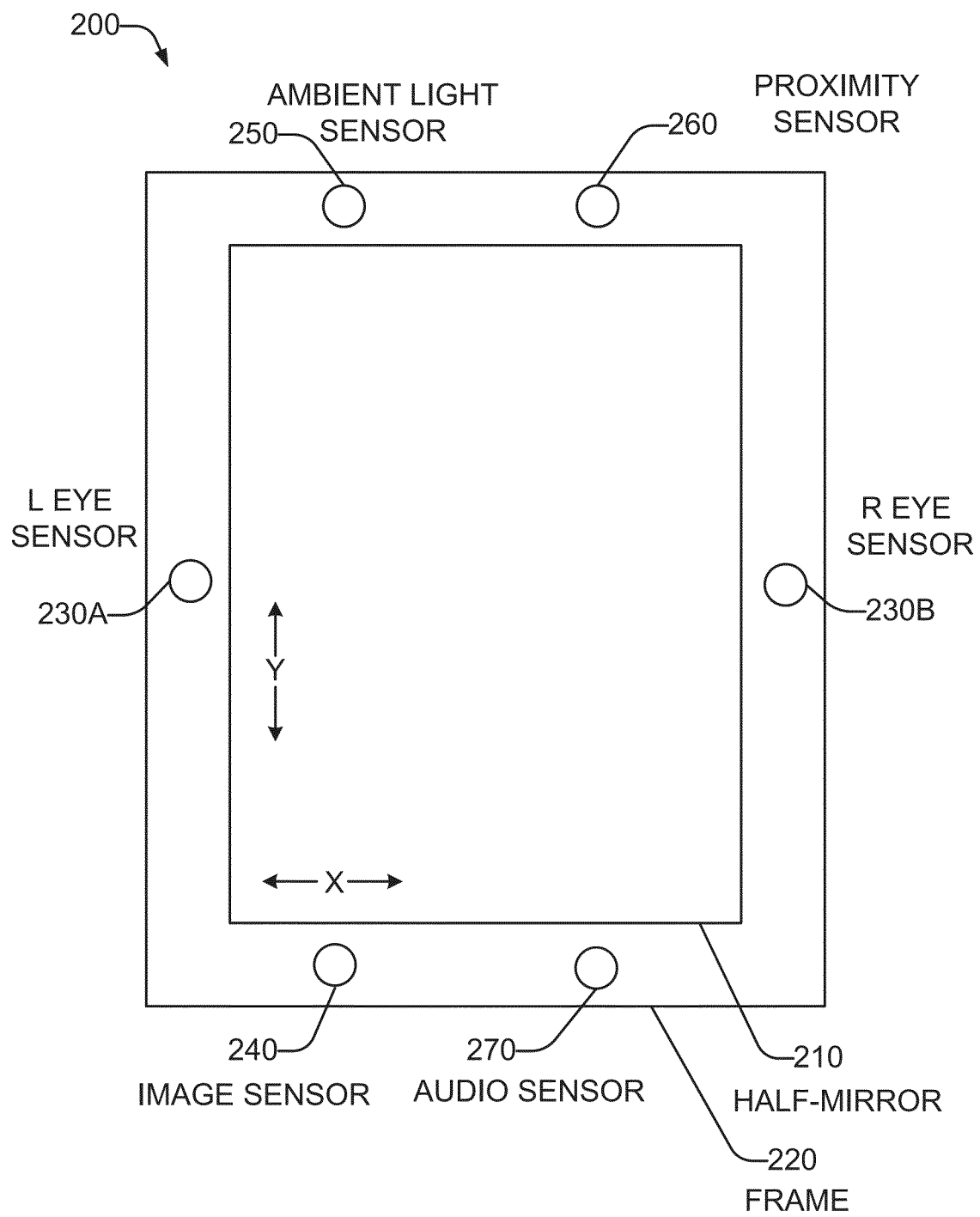
FIG. 2 is a schematic representation of a front view of a smart mirror in accordance with an example of the present disclosure.

Considering now a front view of a smart mirror, and with reference to FIG. 2, one example smart mirror 200 includes a half-mirror 210. In some examples, a frame 200 is disposed around the perimeter of the half-mirror. The smart mirror 200 includes a variety of sensors: left and right eye sensors 230A, 230B, an image sensor (e.g. a camera) 240, an ambient light sensor 250, a proximity sensor 260, and an audio sensor (e.g. a microphone) 270.

The smart mirror 200 can be of any size, and of a horizontal or vertical orientation. A given position on a plane of the smart mirror can be specified in terms of X and Y coordinates. In some examples, the smart mirror 200 has a thickness of less than one inch. The smart mirror 200 can be mounted or hung on a structural surface such as, for example, a wall. The smart mirror 200 can alternatively be free-standing.

The left and right eye sensor 230A, 230B sense one or more characteristics of the eyes of a user facing the smart mirror 200. Each sensor 230A, 230B senses a characteristic of a different eye. The eye sensors 230A, 230B, in some cases in conjunction with the controller of the smart mirror 200, are operable to sense or determine the focal distance of the user's vision. While the left and right eye sensors 230A, 230B are illustrated as separate sensors spaced apart, in other examples the eye sensors 230A, 230B may be combined into a single sensor. Various eye sensors 230A, 230B may be retinal focal point sensors, retinal movement sensors, and/or retinal tracking sensors. Eye sensors 230A, 230B collectively form a binocular (or stereo) eye sensor (also referred to as a binocular eye tracker), which allows characteristics of both eyes such as position or vergence (the simultaneous movement of the pupils of the eyes toward or away from one another during focusing) to be correlated.

One example type of eye sensor 230A, 230B uses infrared diodes to illuminate the users eye so as to generate reflection patterns on the corneas of eye. The reflection patterns, in some cases together with other visual or spatial data about the user, are collected by the sensor for each eye. These patterns and data are then processed to calculate a three-dimensional position of each eye, and a gaze direction in which the user is looking or a two-dimensional gaze point on a plane having a known relationship to the sensors 230A, 230B. Use of this information to determine a focal distance is discussed subsequently in greater detail with reference to FIG. 3.

The image sensor 240 controllably captures an image of what is in front of the smart mirror 200 and within its field of view. The image data may be processed to determine whether there is a user standing in front of the mirror 200. If there is a user in front of the mirror 200, the image data may be processed to attempt to identify the user, such as for example by applying facial recognition techniques to the image data and comparing it against a database of known users. In some examples, facial recognition extracts facial features from the acquired image, such as the relative position, size, and/or shape of the eyes, nose, cheekbones, jawbones, etc. and compares them in geometric or other ways to those of prestored images using algorithms such as principal component analysis, linear discriminate analysis, and/or other techniques.

The image data may also be processed to determine the position of the user with respect to a plane of the mirrors front surface (i.e. the users x-y position with respect to the mirror). The image data may further be processed to determine the distance of the user from the front of the mirror 200 (i.e., the users z position with respect to the mirror).

The ambient light sensor 250 detects the magnitude of the lighting on or adjacent to the front of the mirror 200 in its environment. In some examples, the sensor 250 may also detect other characteristics of the lighting, such as for example the color temperature or other characteristics. This information may be utilized to set appropriate brightness levels for the display. For example, data from the sensor 250 can be used to determine a first brightness level for the display that is used to present the UI on the display in a highly-visible, or readily-perceptible, manner. This data from the sensor 250 can further be used to determine a second brightness level, dimmer than the first brightness level, that is used to present the UI on the display in a less-visible, or indistinct, manner.

It may also be used to help determine if the user is still using the mirror 200 (e.g. the user may be considered as still using a bathroom mirror if the lights are on, even if the user has stepped away from the mirror for a time).

The proximity sensor 260 detects when an object comes within a certain distance of the mirror 200, and/or that an object remains within the certain distance, without any physical contact of the object with the sensor. Some proximity sensors emit an electromagnetic field, a beam of electromagnetic radiation, or a sound wave, and looks for changes in the field or return signal. The sensor 260 may assist in determining the distance of a user from the front of the mirror 200. The sensor 260 may also assist in determining whether a user who is no longer in front of the mirror is still within a certain distance of the mirror is another direction. In these and other ways, the sensor 260 can determine, or assist in determining, whether to turn the smart mirror 200 on or off.

The audio sensor 270 captures sounds which are audible within the vicinity of the smart mirror 200. The sensor 270 may assist with determining whether a user who is no longer in front of the mirror is still using the mirror. For example, a user taking a shower may no longer be in front of the mirror or even within proximity of it, but the sound of the running water may be used to determine that the user is still using the bathroom and the mirror.

Various ones of the different sensors may be used collectively to determine a particular characteristic of the user. Although the various sensors 230-270 are illustrated in FIG. 2 as being disposed outside the area of the half-mirror 210 in the frame 220, in other examples, some or all of the sensors 230-270 are disposed within the area of the half-mirror 210, and the frame 220 may be omitted.

Figure 3:
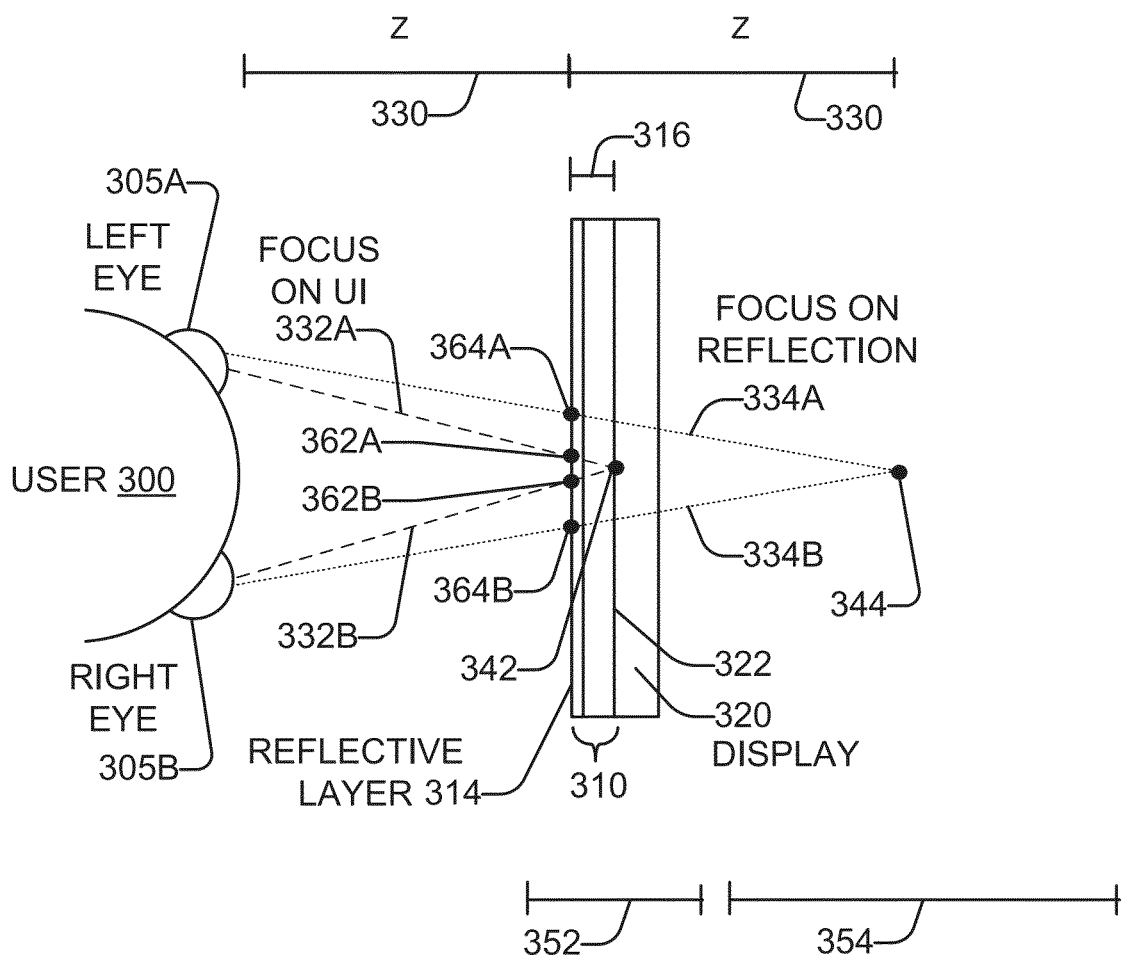
FIG. 3 is a schematic representation of the determination of a focal distance of a user of a smart mirror in accordance with an example of the present disclosure.

Considering now the determination of a focal distance of a user of a smart mirror, and with reference to FIG. 3, a top-down view of a user 300 having a left eye 305A and a right eye 305B is illustrated. A top-down view of a half-mirror 310 having a reflective layer 314, and a display 320, of a smart mirror are also illustrated. The UI is displayed on the display screen 322 of the display 320. The reflective layer 314 and the display screen 322 are separated by a spacing S 316. The user 300—and more specifically the eyes 305A, 305B—are located a distance Z 330 in front of the reflective layer 314.

During operation of the smart mirror, the user 300 can choose to focus at some times on the UI displayed on the screen 322. The focal distance of the user 300 to the screen 322 equals Z+S. In some cases, S is much smaller than Z, and the focal distance can be approximated as Z.

The user 300 can also choose to focus at some times on his or her reflection in the smart mirror. The reflected image appears at the same distance behind the reflective layer 314 that the user 300 is in front of the reflective layer 314. Therefore, the focal distance of the user 300 to the reflection equals Z+Z, or 2Z.

In order for the user 300 to focus his or her eyes 305A, 305B at a particular distance in front of them, the gaze direction of the eyes 305A, 305B changes. To focus upon the display screen 322 in order to view the UI, the gaze of the eyes 305A, 305B turn more inward in gaze directions 332A, 332B respectively. To focus upon the user's reflection, the gaze of the eyes 305A, 305B turn more outward in gaze directions 334A, 334B respectively. These changes in gaze can be detected, and the focal distance of the user determined, using the left and right eye sensors 230A, 230B (FIG. 2).

In one example, the focal distance of the user 300 is determined by detecting the gaze directions of the left eye 305A and right eye 305B of the user 300. The distance Z from the user 300 to the reflective layer 314 (or another plane of the smart mirror) may be determined. Then a point in space at which the gaze directions coincide is calculated, in some examples using triangulation. For example, if the user is focusing on the UI, the gaze directions will coincide at point 342, while if the user is focusing on his or her reflection, the gaze directions will coincide at point 344. If the point in space corresponds to a point on the display screen (e.g. point 342) within a certain tolerance, then it is determined that the user is focusing on the UI. If the point in space corresponds to a point in space (e.g. point 344) at twice the distance Z of the user to the reflective layer 314 within a certain tolerance, then it is determined that the user is focusing on his or her reflection in the smart mirror. A focal distance within the example tolerance range 352 is determined to indicate that the user is focusing on the UI, while a focal distance within the example tolerance range 354 is determined to indicate that the user is focusing on the reflection in the mirror. The gap in distances between ranges 352-354 provides hysteresis to avoid undesirable frequent switching of the display between prominently displaying the UI or prominently displaying the reflection if the focal distance falls near the boundary of the ranges 352, 354. When the focal distance falls outside of ranges 352, 354, no such switching will occur. In an alternative example, it is determined that the user is focusing on his or her reflection in the smart mirror if the focal distance is outside the tolerance range 352, and tolerance range 354 is not used. In some examples, the tolerance ranges 352, 354 can be dependent upon the distance Z, and/or can have an inverse relationship with distance Z In another example, the focal distance of the user 300 is determined by detecting the gaze directions of the left eye 305A and right eye 305B of the user 300. Then the positions on a plane of the smart mirror at which the left eye and right eye gaze directions intersect is determined. The positions may be on the reflective layer 314, on the display screen 322, or on another plane. For example, assume that the plane is the reflective layer 314. If the user is focusing on the UI, the gaze directions intersect the reflective layer 314 at positions 362A, 362B. If the user is focusing on the reflection, the gaze directions intersect the reflective layer 314 at positions 364A, 364B. If the positions on the plane (e.g. reflective layer 314) at which the gaze directions of the eyes 305A, 305B intersect the plane are less than a first predetermined distance apart, then it is determined that the focal distance of the user corresponds to the UI. If the positions on the plane (e.g. reflective layer 314) at which the gaze directions of the eyes 305A, 305B intersect the plane are greater than or equal to a second predetermined distance apart, then it is determined that the focal distance of the user corresponds to his or her reflection. In some examples, the first and second distances may be identical. In other examples, the second distance is greater than the second distance to provide hysteresis in display switching. In further examples, if the positions on the plane (e.g. reflective layer 314) at which the gaze directions of the eyes 305A, 305B intersect the plane are greater than or equal to a second predetermined distance apart and less than a larger third distance apart, then it is determined that the focal distance of the user corresponds to his or her reflection. In some examples, the first, second, and third distances can be dependent upon the distance Z, and/or can have an inverse relationship with distance Z.

Considering now an example operation of a smart mirror to present to a user either readily-perceptible (or highly-visible) imaging, or indistinct (or less-visible) imaging, and with reference to FIGS. 4A-4B, a smart mirror 400 is used in an environment having ambient lighting. The ambient lighting may have a particular level of brightness, evenness, color, color range, and/or other characteristics. An ambient light sensor 260 (FIG. 2) can sense the characteristics of the ambient light in the vicinity of the mirror 400. The smart mirror 400 includes a half-mirror having a reflective layer 414 on or in a substrate 412, and a display 420 having a display screen adjacent a back side of the mirror 400. A user views the opposite front side of the mirror 400.

FIG. 4A schematically illustrates operation of the smart mirror 400 in a mirror mode, and FIG. 4B in a user interface mode. In the mirror mode of FIG. 4A, the display 420 is operated at a brightness level which is significantly less than the brightness level of the ambient light 405A. Ray 430A represents lower-brightness light emitted from the display 420 as part of the UI presented on the display 420. The ray 430A passes through the half-mirror, including the reflective layer 414 which is partially-transmissive, and emerges in diminished form as ray 435A. Ray 440A represents higher-brightness light impinging the reflective layer 414 from the front side of the smart mirror 400. The lower brightness of the ray 435A, relative to the higher brightness of the reflected ray 445A, causes the UI to appear less-visible, dimmer, or indistinct, while the user's reflected image appears highly-visible, brighter, or readily-perceivable. Furthermore, the brightness level in regions of the display 420 which are outside the UI is maintained at or near the black point. As a result, almost no light from the display 420 passes through the reflective layer 414 in those regions, and thus the user's reflected image appears substantially the same as it would for a standard (i.e. non-half) mirror.

Conversely, in the UI mode of FIG. 4B, the display 420 is operated at a brightness level which is significantly greater than the brightness level of the ambient light 405B. Ray 430B represents higher-brightness light emitted from the display 420 as part of the UI presented on the display 420. The ray 430B passes through the half-mirror and emerges as ray 435A. Ray 440B represents lower-brightness light impinging the reflective layer 414 from the front side of the smart mirror 400. The higher brightness of the ray 435B, relative to the lower brightness of the reflected ray 445B, causes the UI to appear highly-visible, brighter, or readily-perceivable, while the user's reflected image appears less-visible, dimmer, or indistinct. Furthermore, the brightness level in regions of the display 420 which are outside the UI is maintained at a level of brightness higher than the lower-brightness light impinging the reflective layer 414 from the front side of the smart mirror 400. These brighter display regions may present a uniform expanse of gray or white. Because these regions are brighter than the lower-brightness front-side light, a significant amount of light from the display 420 passes through the mirror to the front side and washes out, or lowers the contrast in, the reflection of the user to a significant extent, so that the reflected image in the non-UI areas also appears less-visible, dimmer, or indistinct.

Figure 5B:
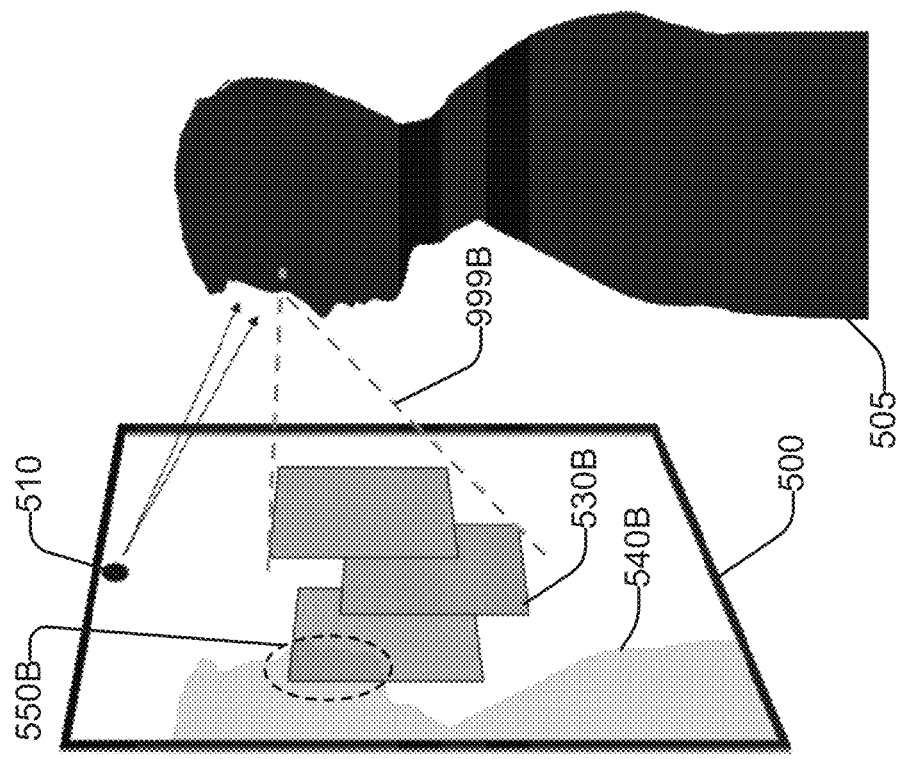
FIGS. 5A-5B are schematic representations of the response of a smart mirror to the eye focal distance of a user facing the smart mirror, in accordance with an example of the present disclosure.
Figure 5A:
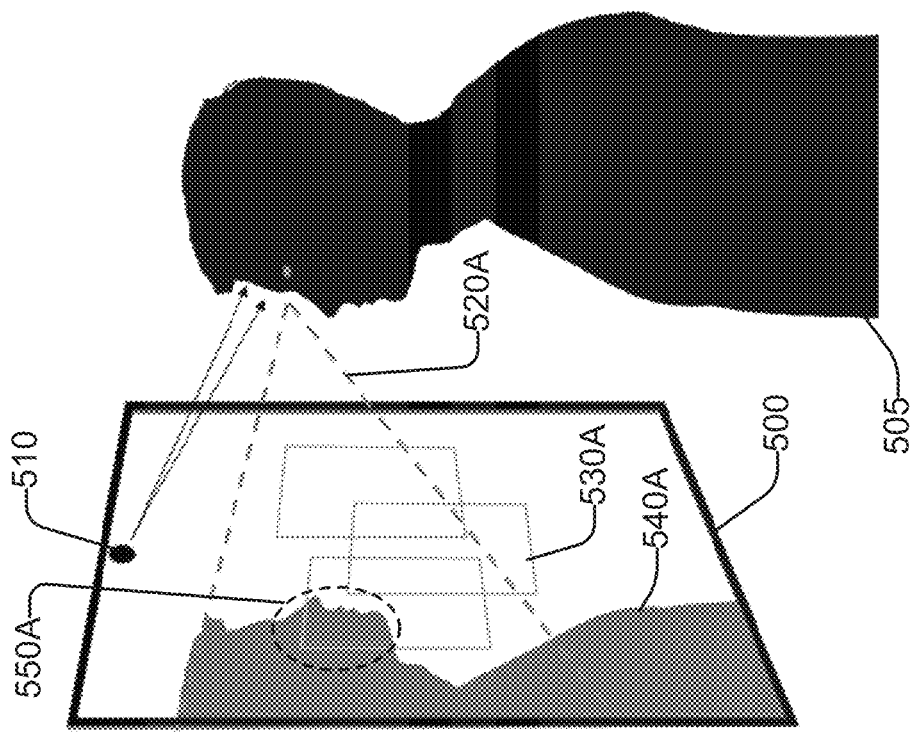

Considering now a schematic representation of a smart mirror's response to the eye focal distance of a user facing the smart mirror, and with reference to FIGS. 5A-5B, FIG. 5A illustrates the smart mirror's appearance when the user is focusing on his or her reflection in the smart mirror, while FIG. 5B illustrates the smart mirror's appearance when the user is focusing on the UI presented by the smart mirror. A binocular eye sensor 510 senses characteristics of the user's left and right eyes in the same or similar way as has been described heretofore for the left and right eye sensors 230A, 230B (FIG. 2).

In FIG. 5A, the user 505 is focusing his or her eyes 520A on the reflection in the smart mirror 500. The mirror 500 detects the focal distance of the user as corresponding to the reflection. In response, the mirror 500 displays the user interface 530A in an indistinct, less-visible, or dimmer manner, and displays the reflection 540A in a readily-perceptible, highly-visible, or brighter manner.

In FIG. 5B, the user 505 is focusing his or her eyes 520B on the reflection in the smart mirror 500. The mirror 500 detects the focal distance of the user as corresponding to the user interface. In response, the mirror 500 displays the user interface 530B in a readily-perceptible or highly-visible manner, and displays the reflection 540B in an indistinct or less-visible manner.

In one example, the perceptibility or the visibility of the reflection 540A, 540B is changed by controlling the brightness and/or the contrast of the reflected image. The reflection 540A is brighter and/or has higher contrast, while the reflection 540B is dimmer and/or has lower contrast.

In one example, the perceptibility or the visibility of the user interface 530A, 530B is changed by controlling the brightness and/or the contrast of the reflected image. In another example, the perceptibility or the visibility of the user interface 530A, 530B is changed by increasing or decreasing the size of the UI 530A, 530B, such as, for example, by minimizing or maximizing the various UI content items. In still another example, the perceptibility or the visibility of the user interface 530A, 530B is changed by presenting the various UI content items in outline form 530A or in filled-in form 530B.

In some examples, for a given x-y region 550 of the smart mirror 500 in which the user interface 530A, 530B is displayed, both the user interface and the user's reflection are visible simultaneously. In region 550A, the reflection 540A is more prominently visible than the UI 530A, while in region 550B, the UI 530B is more prominently visible than the reflection 540B. However, both the UI 530 and the reflection 540 are visible in the region 550 regardless of whether the user is focusing on the reflection (FIG. 5A) or the UI (FIG. 5B). In other words, both the reflection and the user interface are simultaneously visible in the region, although one will be more prominently visible (or readily perceptible) than the other.

Figure 6:
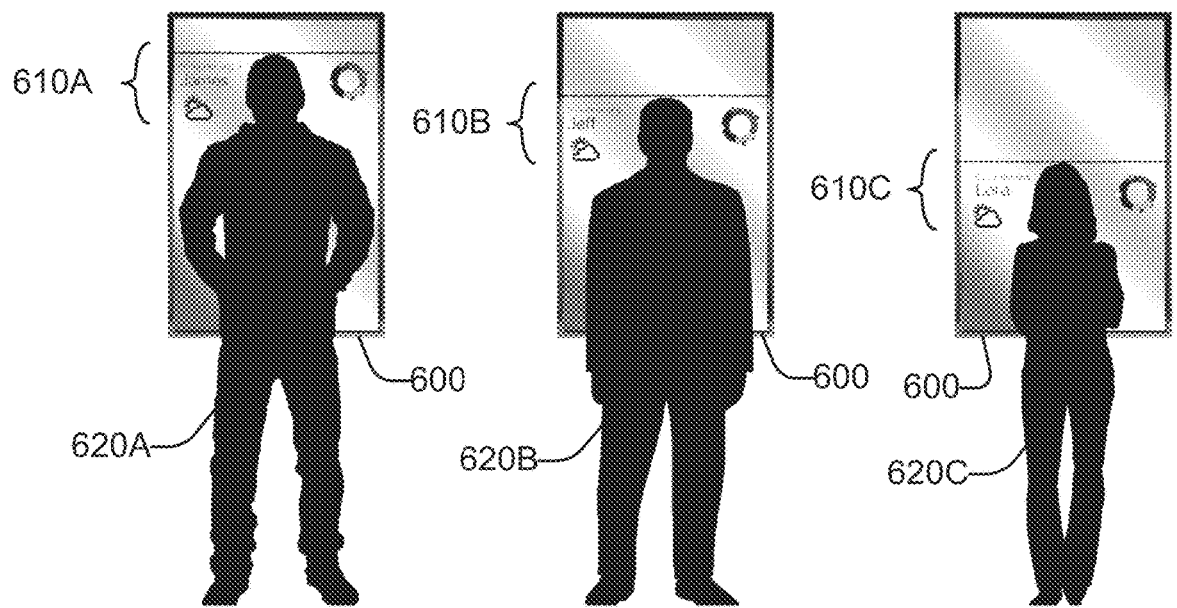
FIG. 6 is a schematic representation of the location on a smart mirror of a user interface in relation to a particular user, in accordance with an example of the present disclosure.

Considering now the location on a smart mirror of a user interface in relation to a particular user, and with reference to FIG. 6, a user interface 610A-610C is displayed on the smart mirror 600 in an x-y position which is determined from an x-y position of the user with respect to a plane of the smart mirror.

For example, three users 620A-620C of different heights are standing in front of a smart mirror 600. The user interfaces 610A-610C are each displayed at a different location on the smart mirror 600. The location may be determined based on information acquired by one or more sensors of the smart mirror 600, such as for example the user's height, the user's eye level, whether the user is centered in front of the mirror or standing to the left or right, or other characteristics of the user. The x-y location on the smart mirror may be chosen as the optimal position from an ergonomic or usability perspective for that particular user. Where the smart mirror recognizes the identity of a particular user, an x-y location which is prestored for that user may be utilized. A combination of both prestored information and sensed information may be used in determining the x-y location for the user interface.

Figure 7:
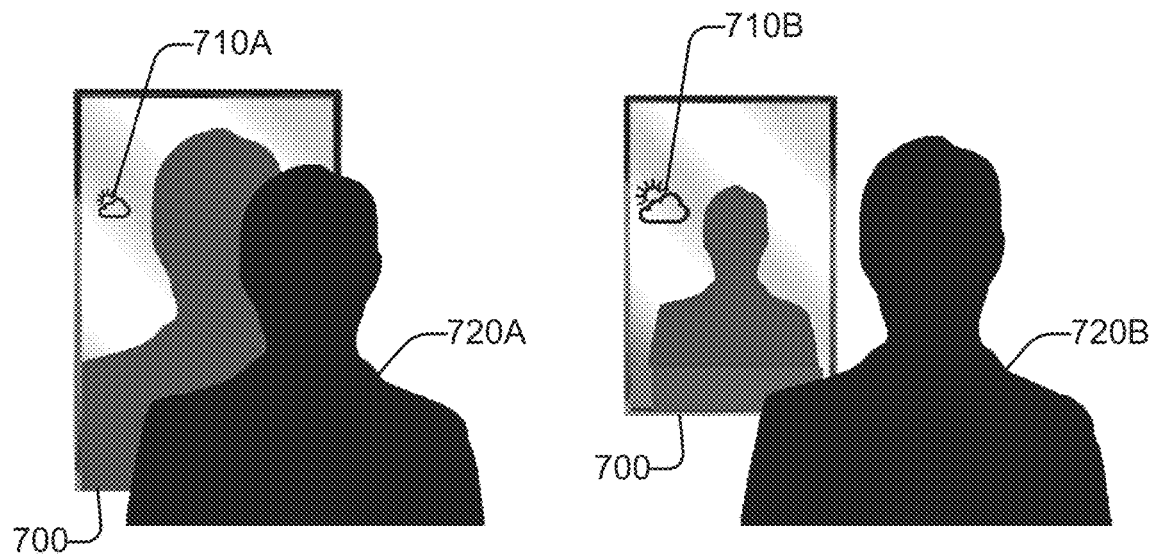
FIG. 7 is a schematic representation of the size of a user interface on a smart mirror in relation to a particular distance of user from the smart mirror, in accordance with an example of the present disclosure.

Considering now the size of a user interface on a smart mirror in relation to a particular distance of a user from the smart mirror, and with reference to FIG. 7, a user interface 710A-710B is displayed on a smart mirror 700 in a size which is determined from a distance of the user from the smart mirror 700.

For example, a user 720A is standing closer to the smart mirror 700 than a user 720B, and the size of the user interface 710A-710B is different. In one example, the size of the user interface 710 has an inverse relationship to the distance of the user 720 from the smart mirror 700, which allows a user 720B who is standing further away from the smart mirror 700 to see a larger user interface 710B than the user interface 710A seen by a user 720A who is tanding closer to the smart mirror 700. The distance of the user to the smart mirror 700 may be determined based on information acquired by one or more sensors of the smart mirror 700.

The size of the user interface on the smart mirror may be chosen as the optimal size from an ergonomic or usability perspective for a user at that particular distance. Where the smart mirror recognizes the identity of a particular user, a size (or size-distance factor) which is prestored for that user may be utilized. A combination of both prestored information and sensed information may be used in determining the size of the user interface 710.

Figure 8:
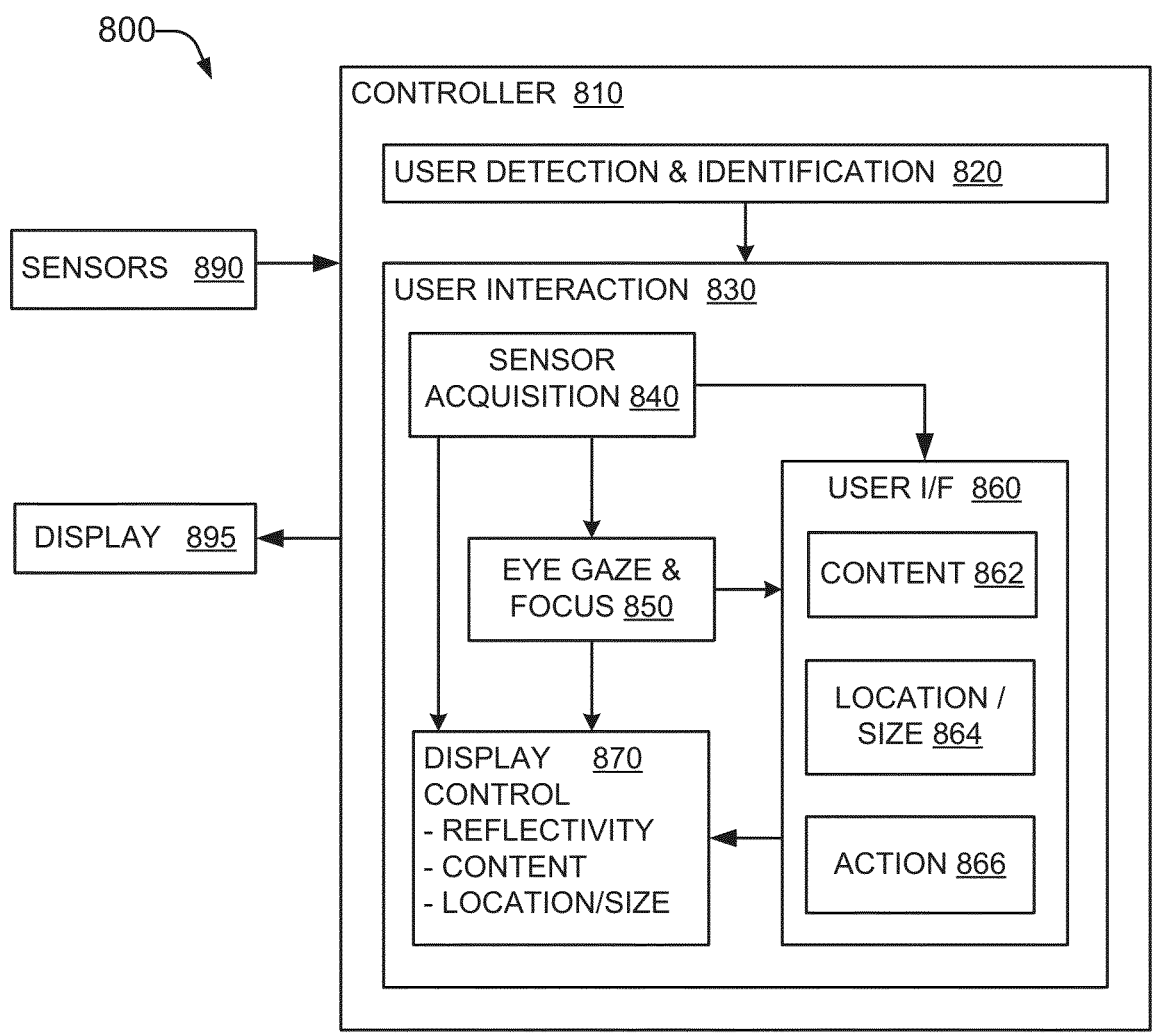
FIG. 8 is a schematic representation of a controller usable with the smart mirrors of FIGS. 1 through 7, in accordance with an example of the present disclosure.

Considering now in greater detail a controller of a smart mirror, and with reference to FIG. 8, a smart mirror 800 includes a controller 810. The controller interfaces to an arrangement of sensors 890 and a display 895. In some examples, the controller 800 may be the controller 140 (FIG. 1); the sensors 890 may be the sensors 130 (FIG. 1) and/or the sensors 230-270 (FIG. 2); and the display 895 may be the display 120 (FIG. 1), the display 320 (FIG. 3), and/or the display 420 (FIG. 4). The controller 810 acquires information from the sensors 890, and controls the information presented on the display 895 as well as the manner in which it is presented. FIG. 8 may be considered as a logical structure of the controller 810, a flowchart of the operation of and/or data flow within the controller 810, or a method implemented in the controller 810. For clarity of the following description, the term "module" will be used to refer to the structure, flowchart, and method.

The controller 810 includes a user detection and identification modules 820 and a user interaction module 830. The user detection and identification module 820 detects whether an object is within proximity of the smart mirror 800, determines whether that object is a person (a user) and, if the object is a person, attempts to determine an identity of that person. The user detection and identification module 820 may provide biometric information about the user to the user interaction module 830. If the user is an identified person, the user detection and identification module 820 may obtain and provide prestored information associated with the user to the user interaction 830. The prestored information may include preference information associated with that user, and/or UI content associated with that user.

The user interaction module 830 determines how to control the display 895 and the information to be presented on the display 895. The user interaction module 830 can also acquires biometric information about the user and environmental information about the mirror. The user interaction module 830 encompasses several sub-modules. A sensor acquisition module 840 acquires information or data from the arrangement of sensors of the smart mirror 800, and provides this to an eye gaze point and focal distance module 850, a user interface module 860, and a display control module 870. The eye gaze point and focal distance module 850 determines whether the user's focal distance corresponds to the UI of the smart mirror 800, or to the reflection in the smart mirror. Also, when the user is focusing on the UI, the eye gaze point and focal distance 850 also determines the x-y position of the mirror which is being gazed at by the user. The eye gaze point and focal distance module 850 provides some or all of this information to the display control module 870 and/or the user interface module 860.

The user interface module 860 includes a content sub-module 862, a location and size sub-module 864, and an action processing sub-module 866. The location and size sub-module 864 uses position and distance information about the user to determine the size and location on the display of the user interface. The content sub-module 862 receives any user UI preference and content information from the user detection and identification module 820, and determines the content to be displayed on the UI. The action processing sub-module 866 receives the users x-y gaze position within the UI and may receive and/or acquire information about the persistence of the user's gaze at or near that position. If the user is persistently gazing at a point which corresponds to an action icon or element of the UI, the action processing sub-module 866 performs the corresponding action, which may include revising the content to be displayed on the UI.

The display control module 870 receives the UI content to be displayed for the UI, and the size and position of the UI, from the user interface module 860. The display control module 870 also receives a determination from the eye gaze and focus module 850 as to whether the user is focusing on the UI or the reflection. The display control module 870 then displays the content in the size and at the location specified, and controls the reflectivity of the half-mirror of the smart mirror 800 so as to display one of the UI or the reflection in a highly-visible or readily-perceptible manner, and the other of the UI or the reflection in a less-visible or indistinct manner.

Figure 9:
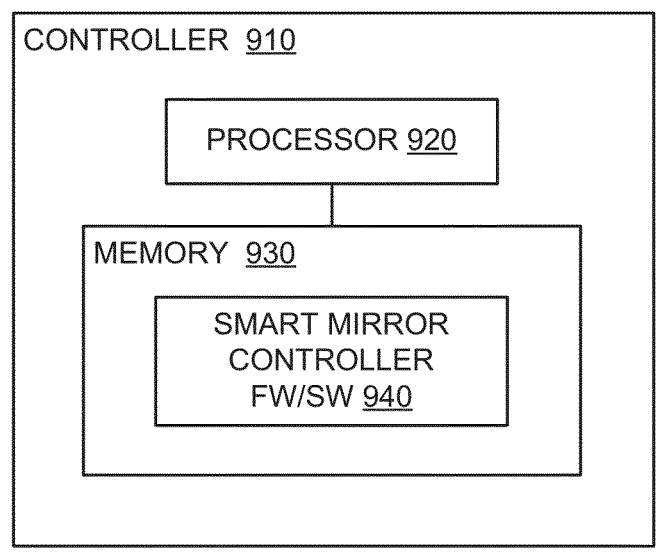
FIG. 9 is a schematic representation of a firmware and/or software implementation of the controller of FIG. 8 in accordance with an example of the present disclosure.

The controller 810 may be implemented in hardware, or in a combination of hardware and firmware and/or software. In one hardware implementation, the controller 810 may be implemented using at least one ASIC, gate array, finite state machine, and/or other such components. Considering now an another implementation of the controller 810 in a combination of hardware and firmware and/or software, and with reference to FIG. 9, a controller 910 includes a processor 920 communicatively coupled to a memory 930. The memory 930 is a computer-readable storage medium which has stored therein smart mirror controller firmware and/or software instructions 940 that are executable by the processor 920 to implement the functions and perform the operations which have been described heretofore for the controller 810.

Figure 10:
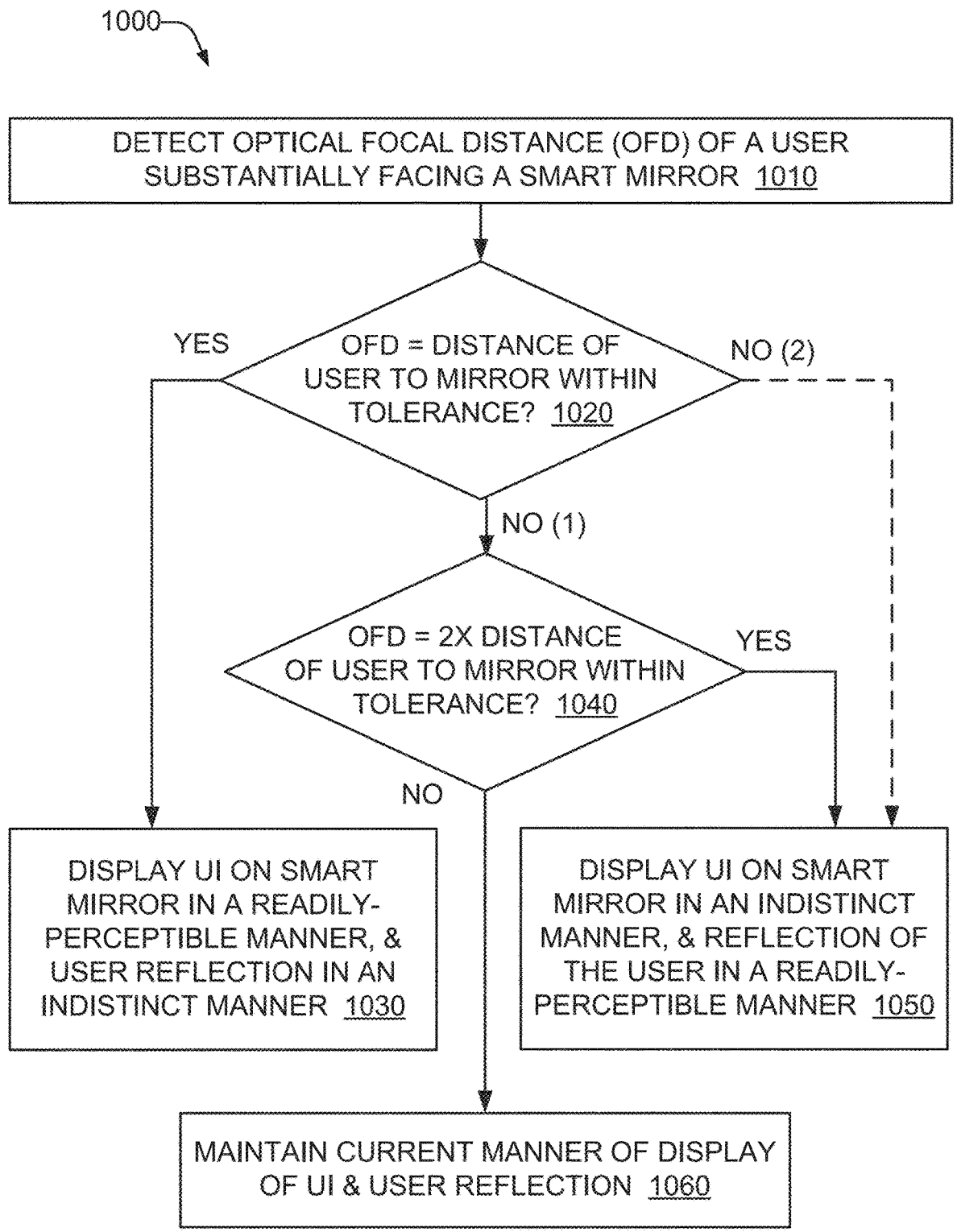
FIG. 10 is a flowchart in accordance with an example of the present disclosure of a method of operating a smart mirror.

Considering now one example method of operating a smart mirror, and with reference to FIG. 10, a method 1000 may alternatively be considered as a flowchart of the operation of a controller of smart mirror. In some examples, the smart mirror may be the smart mirror 100 (FIG. 1), 200 (FIG. 2), and/or 400 (FIG. 4), and the controller may be the controller 140 (FIG. 1) and/or 800 (FIG. 8). The method 1000 begins, 1010, by detecting the optical focus distance (OFD) of a user who is substantially facing a smart mirror. At 1020, it is determined whether the optical focal distance corresponds to a distance of the user to a half-mirror surface of the smart mirror within a first predetermined tolerance. If the optical focal distance does so correspond ("Yes" branch of 1020), then at 1030 the method displays a user interface on the smart mirror in a readily-perceptible, highly-visible, and/or relatively brighter manner, and a reflection of the user in an indistinct, less-visible, and/or relatively dimmer manner.

If the optical focal distance does not correspond to a distance of the user to the half-mirror surface within the first predetermined tolerance, then if the optical focal distance corresponds to a different distance range, the method displays the user interface on the smart mirror in the indistinct, less-visible, and/or relatively dimmer manner and a reflection of the user in the readily-perceptible, highly-visible, and/or relatively brighter manner. The different distance range can be implemented in various ways.

More particularly, if at 1020 the optical focal distance does not correspond to a distance of the user to the half-mirror surface within the first predetermined tolerance, then in one example (solid-line "No (1)" branch of 1020) it is determined at 1040 whether the optical focal distance corresponds to twice the distance of the user to the half-mirror surface within a second predetermined tolerance. If the optical focal distance does so correspond ("Yes" branch of 1040), then at 1050 the method displays the user interface on the smart mirror in the indistinct, less-visible, and/or relatively dimmer manner and a reflection of the user in the readily-perceptible, highly-visible, and/or relatively brighter manner. If the optical focal distance does not so correspond ("No" branch of 1040), then at 1060 the method maintains the current manner of display of the user interface and the user reflection. In other words, if the OFD distance does not match at either of blocks 1020, 1040, no change is made to the manner of display of the smart mirror. By defining the first and second tolerances such that there is a gap between the distance ranges that set a particular manner of display (e.g. a gap between the distance ranges 352, 354 of FIG. 3), hysteresis can be provided to avoid undesirable frequent switching of the manner of display if the OFD falls near a boundary of the distance ranges.

Alternatively, if at 1020 the optical focal distance does not correspond to a distance of the user to the half-mirror surface within the first predetermined tolerance, then in another example (dashed-line "No (2)" branch of 1020), the method branches to block 1050.

Figure 11:
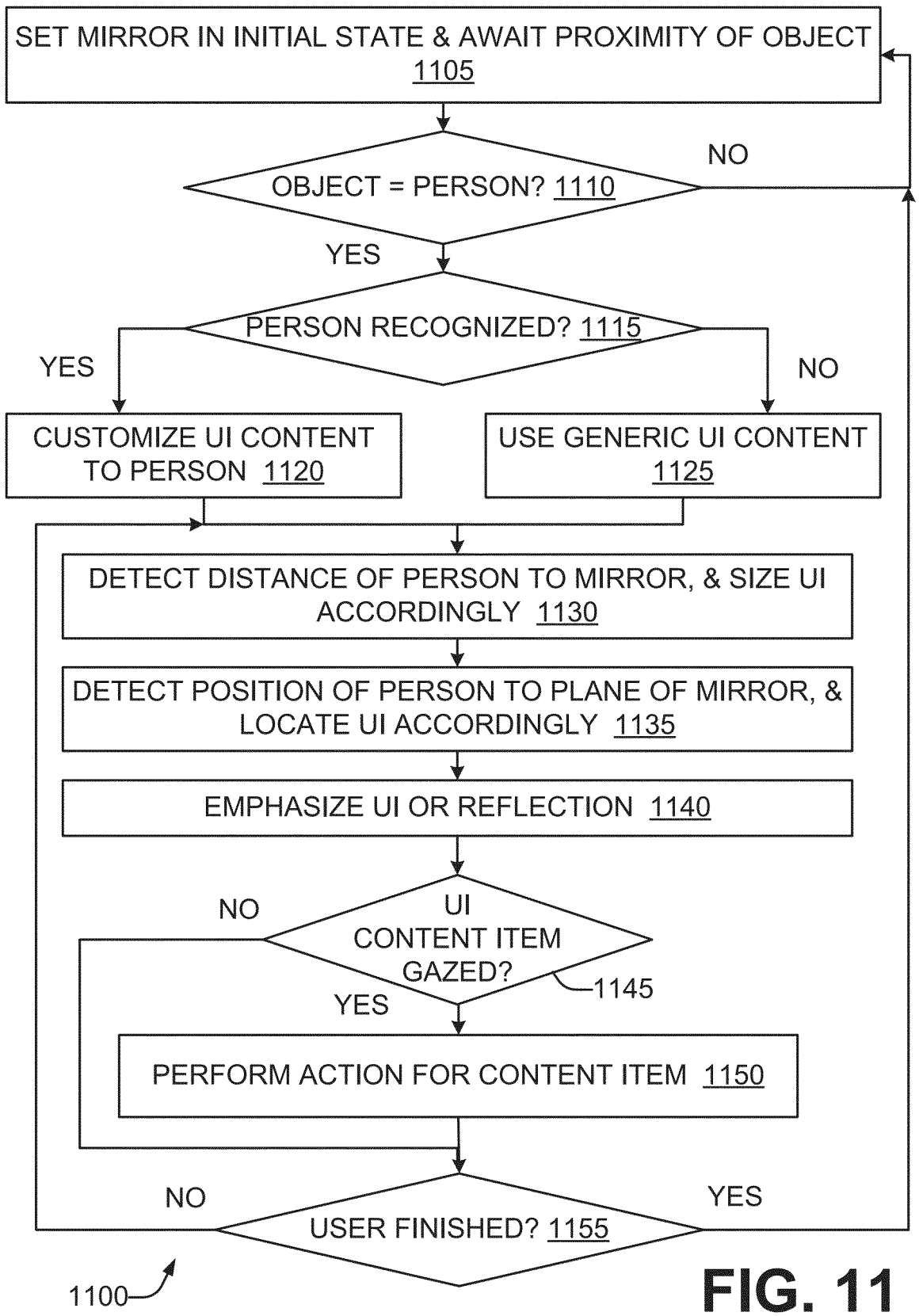
FIG. 11 is a flowchart in accordance with an example of the present disclosure of another method of operating a smart mirror.

Considering now another example method of operating a smart mirror, and with reference to FIG. 11, a method 1100 may alternatively be considered as a flowchart of the operation of a controller of smart mirror. In some examples, the smart mirror may be the smart mirror 100 (FIG. 1), 200 (FIG. 2), and/or 400 (FIG. 4), and the controller may be the controller 140 (FIG. 1) and/or 800 (FIG. 8). The method 1100 begins, at 1105, by setting the smart mirror in an initial state and awaiting an object to come within proximity of the smart mirror. In some examples, the initial state is a power-saving idle mode with the mirror's display powered off, such that the smart mirror functions as an ordinary mirror. Proximity to the smart mirror may be predetermined as a specified distance from the smart mirror. In some examples, the distance may depend on whether the object is substantially in front of the mirror, or off to a side of the mirror. In some examples, the object has a minimum size. In some examples, the object is a movable object, or an object that is not within proximity with the smart mirror at all times, such as objects having a fixed position in the same room as the smart mirror.

At 1110, the presence of an object meeting the predefined criteria for object proximity is detected by the smart mirror and it is determined whether the object is a person. If not ("No" branch of 1110), the method returns to 1105. If the object is determined to be a person ("Yes" branch of 1110), then at 1115 the smart mirror attempts to determine the identity of the person. In some examples, the identity of the user is determined using biometric information, such as facial recognition. If the person can be identified by the smart mirror ("Yes" branch of 1115), then at 1120 user interface content customized to that person is selected for display. Other aspects of the smart mirror, such as user interface brightness, which in some cases may be relative to ambient brightness, can also be customized to, or by, the user. If the person is not identified ("No" branch of 1115), then at 1125 generic content for the user interface is selected for display. In one example, the generic content for display could include the time, a weather widget, some breaking news, etc. At 1130, the distance of the user from the smart mirror is detected, and the user interface is displayed on the smart mirror at a size which is determined from the distance. At 1135, a position of the user with respect to an x-y plane of the mirror is detected, and the user interface is displayed on the smart mirror at a location which is determined from the position.

At 1140, either the user interface, or the reflection of the person, is visually emphasized on the smart mirror based on the optical focal distance of the person. In one example, step 1140 comprises the method 1000 (FIG. 10).

At 1145, when the user interface is being visual emphasized (e.g., displayed in the readily-perceptible, more-visible, or brighter manner), the gaze position of the user on the half-mirror surface of the smart mirror is detected. If the gaze position corresponds to a particular content item that is displayed on the user interface ("Yes" branch of 114), then at 1150 an action associated with that particular content item is performed. In one example, the action includes enlarging in size and/or displaying in greater detail the particular content item upon which the user if gazing. In another example, the content item may represent a functional icon (e.g. an Application, a "Home" button, a "Back" button, an "OK" button, etc.), and the action includes performing the corresponding action, which may include change the content item(s) displayed on the user interface. In some examples, the action is performed if, and after, the user has gazed at a location corresponding to the particular content item for a predefined length of time.

At 1155, it is determined whether the user is finished using the smart mirror. This can be determined in various ways. As one example, the user may move out of proximity with the mirror, in some cases for a predetermined amount of time so as to allow the user to step away temporarily and still keep the mirror operating. As another example, the ambient light level may be significantly reduced, such as would occur if the user has turned out the lights, signifying that the user is finished with using the mirror. If the user is finished with using the mirror ("Yes" branch of 1155), then the method branches to 1105 to reset the mirror to its initial state and await proximity of another object. However, if the user is not finished with using the mirror ("No" branch of 1155), then the method branches to 1130. Doing so allows the mirror to adjust for changes in the user's distance to the mirror, location relative to the mirror plane, and/or optical focal distance, and/or selection of another action to be performed.

In some examples, a user can create a user profile containing personalized content items and mirror operating characteristics. These may be set by interacting with the smart mirror via gaze and focus as has been described, and/or by use of a touchscreen included in the smart mirror. These may also be set through a smart mirror application on a computer, tablet, smart phone, etc. which can be communicatively coupled to the smart mirror.

In some examples, at least one block or step discussed herein is automated. In other words, apparatus, systems, and methods occur automatically. As defined herein and in the appended claims, the terms "automated" or "automatically" (and like variations thereof) may be broadly understood to mean controlled operation of an apparatus, system, and/or process using computers and/or mechanical/electrical devices without the necessity of human intervention, observation, effort and/or decision.

From the foregoing it will be appreciated that the smart mirror, method, and medium by the present disclosure represent a significant advance in the art. Although several specific examples have been described and illustrated, the disclosure is not limited to the specific methods, forms, or arrangements of parts so described and illustrated. For example, examples of the disclosure are not limited to smart mirrors, but may be used for other smart surfaces. This description should be understood to include all combinations of elements described herein, and claims may be presented in this or a later application to any combination of these elements. The foregoing examples are illustrative, and different features or elements may be included in various combinations that may be claimed in this or a later application. Unless otherwise specified, operations of a method claim need not be performed in the order specified. Similarly, blocks in diagrams or numbers (such as (1), (2), etc.) should not be construed as operations that proceed in a particular order. Additional blocks/operations may be added, some blocks/operations removed, or the order of the blocks/operations altered and still be within the scope of the disclosed examples. Further, methods or operations discussed within different figures can be added to or exchanged with methods or operations in other figures. Further yet, specific numerical data values (such as specific quantities, numbers, categories, etc.) or other specific information should be interpreted as illustrative for discussing the examples. Such specific information is not provided to limit examples. The disclosure is not limited to the above-described implementations, but instead is defined by the appended claims in light of their full scope of equivalents. Where the claims recite "a" or "a first" element of the equivalent thereof, such claims should be understood to include incorporation of at least one such element, neither requiring nor excluding two or more such elements. Where the claims recite "having", the term should be understood to mean "comprising".

What is claimed is:

1. A smart mirror, comprising:
   a display adjacent one side of a half-mirror;
   sensors to acquire biometric information of a user facing an opposite side of the half-mirror;
   a controller coupled to the sensors and the display to
      determine from the biometric information a focal distance of the user,
      present a user interface on the smart mirror in a highly-visible manner and a reflection of the user in a less-visible manner if the focal distance corresponds to the display, and
      present the user interface on the smart mirror in a less-visible manner and the reflection of the user in a highly-visible manner if the focal distance corresponds to the reflection of the user.

2. The mirror of claim 1, wherein the sensors comprise a binocular eye sensor.

3. The mirror of claim 1, wherein the display comprises an OLED display having a screen disposed against the one side of the viewing screen.

4. The mirror of claim 1, wherein the sensors comprise a camera, and wherein the controller is further to
   determine from the biometric information an identity of the user, and
   customize content of the user interface based on the identity.

5. The mirror of claim 4, wherein the controller is further to
   determine, from the biometric information, a position of the user with respect to the mirror, and
   present the user interface on the display at an x-y location which is determined from the position.

6. The mirror of claim 1, wherein the controller is further to
   determine, from the biometric information, a distance of the user from the mirror, and
   present the user interface on the display at a size which is determined from the distance.

7. The mirror of claim 1, comprising:
   an additional sensor to acquire environmental information about an environment of the mirror; and wherein the controller is further to
      determine a first brightness level used to present the user interface on the display in the highly-visible manner, and
      determine a second brightness level, dimmer than the first brightness level, used to present the user interface on the display in the less-visible manner.

8. A method of operating a smart mirror, comprising:
   detecting an optical focal distance of a user substantially facing the smart mirror,
   if the optical focal distance corresponds to a distance of the user to a half-mirror surface of the smart mirror within a predetermined tolerance, displaying a user interface on the smart mirror in a readily-perceptible manner and a reflection of the user in an indistinct manner; and displaying the user interface on the smart mirror in the indistinct manner and the reflection of the user in the readily-perceptible manner if the optical focal distance corresponds to a different range of distances.

9. The method of claim 8, wherein a region of the mirror corresponds to both the reflection and the user interface, and both the reflection and the user interface are simultaneously visible in the region.

10. The method of claim 8, comprising:
    detecting a distance of the user from the smart mirror; and
    displaying the user interface on the smart mirror at a size which is determined from the distance.

11. The method of claim 8, comprising:
    detecting a position of the user with respect to a plane of the mirror, and
    displaying the user interface on the smart mirror at a location which is determined from the position.

12. The method of claim 8, comprising:
    when displaying the user interface in the readily-perceptible manner,
        detecting that a gaze position of the user on a half-mirror surface of the smart mirror corresponds, for a predetermined time, to a particular content item displayed on the user interface, and
        performing an action associated with the content item.

13. The method of claim 8, comprising:
    detecting a presence of an object within a predefined distance from the smart mirror;
    determining if the detected object is a person;
    if the detected object is a person, attempting to identify the person;
    if the person is identified, displaying content customized to the identified person on the user interface; and
    if the person is not identified, displaying generic content on the user interface.

14. A non-transitory computer-readable storage medium having an executable program stored thereon, wherein the program instructs a processor to:
    acquire, using sensors, biometric information about a user facing a smart mirror;
    determine, using the biometric information, an optical focal distance of the user to the smart mirror;
    control a display to present a user interface at an adjacent half-mirror in a highly-visible manner and a reflection of the user in a less-visible manner when the optical focal distance corresponds within a predetermined tolerance to a distance of the user to the half-mirror; and
    otherwise, control the display to present the user interface at the half-mirror in the less-visible manner and the reflection of the user in the highly-visible manner.

15. The medium of claim 14, wherein the program further instructs the processor to:
    detect a distance of the user from the half-mirror;
    detect a position of the user with respect to a plane of the half-mirror;
    control the display to present the user interface on the smart mirror at a size and at a location which are determined from the distance and the position.

* * * * *